May 15, 1951  A. J. VANDER WHITE  2,552,825

PISTON VALVE

Filed Dec. 14, 1946

INVENTOR
ALFRED J. VANDER WHITE.
BY
Thomas Astberg
ATTORNEY.

Patented May 15, 1951

2,552,825

UNITED STATES PATENT OFFICE 2,552,825

PISTON VALVE

Alfred J. Vander White, San Francisco, Calif.

Application December 14, 1946, Serial No. 716,401

1 Claim. (Cl. 251—68)

This invention relates to valves, and especially that type known as piston valves.

The object of the present invention is generally to improve and simplify the construction and operation of valves of the character described; to provide a piston valve whereby flow of a fluid or liquid may be readily regulated from a full flow to the minutest flow imaginable; and further, to provide a valve which is seated and expanded by wedge action to insure against leakage when the valve is closed.

The piston valve is shown by way of illustration in the accompanying drawings, in which.

Figure 1:
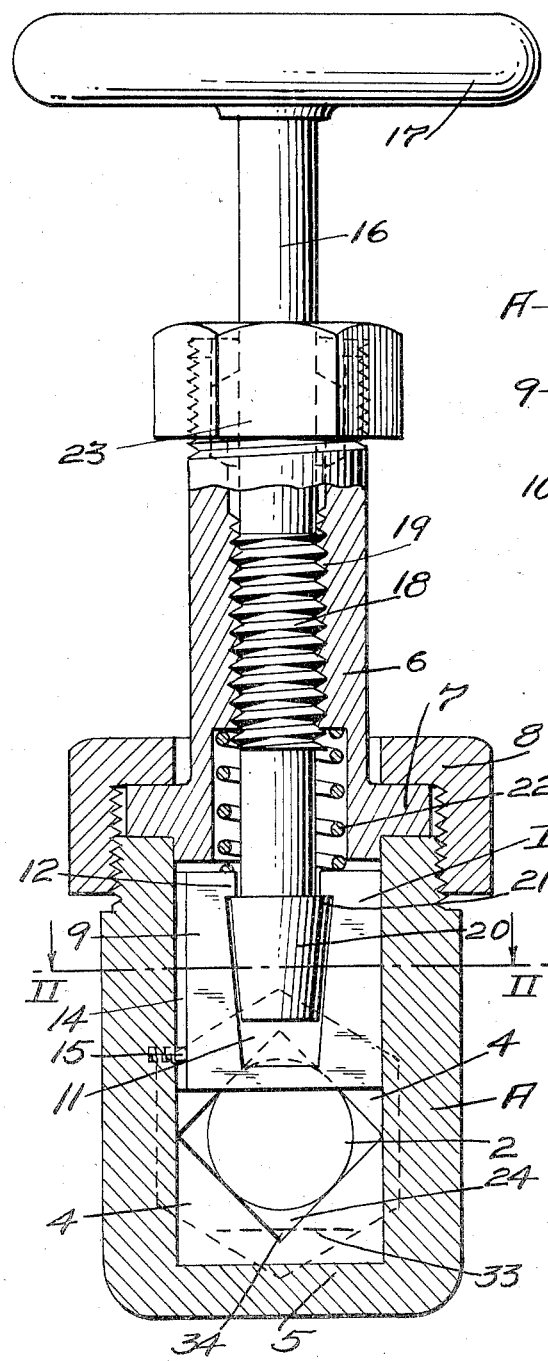
Fig. 1 is a partial vertical cross section of the valve.
Figure 3:
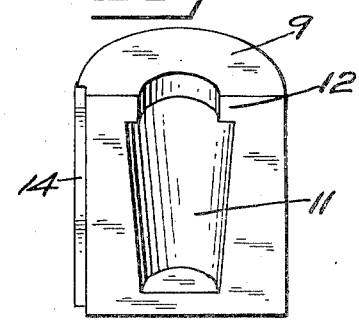
Fig. 3 is a perspective view of one half section of the piston valve.

Referring to the drawings in detail, and particularly Fig. 1, A indicates a valve body or casing having an inlet port 2 and an outlet or discharge port 3. Formed within the body of the valve is a cylindrical shaped chamber 4 which is closed at one end by a bottom section 5 and at the upper end by a removable head member 6. This head member has an annular flange 7 which rests on the upper end of the valve body and is secured to the upper end of the valve body by a screw cap 8. Mounted for vertical movement within the cylinder shaped chamber 4 is a piston valve generally indicated at B. This valve is made in two halves such as shown at 9 and 10. The two half sections have a tapering annular chamber formed within them which is generally shown at 11, said chamber being largest in diameter at the upper end and terminating in an annular collar 12. The half section 9 of the valve shown in Fig. 3 is provided with a longitudinally extending groove 14 into which a pin 15 extends. This pin serves the function of securing the piston valve as a whole against rotation as will hereinafter be described.

Extending through the head member 6 is a valve stem 16 on the upper end of which is secured a handle 17 whereby the stem may be rotated. A portion of the stem is threaded as shown at 18, and this threaded portion engages cooperating threads 19 formed in the head 6. The lower end of the stem extends into the chamber 11 of the piston valve and it is provided with an annular tapering member 20 which substantially fits the upper end of the chamber 11. A shoulder 21 is formed at the upper end of the tapering member 20, and this engages the annular shoulder 12 on the piston valve, the two shoulders being normally maintained in engagement by a compression spring 22 which is interposed between the head and the piston valve as shown in Fig. 1. The upper end of the head member 6 is provided with a stuffing box and actuating nut 23 of any suitable construction so as to prevent leakage of fluid or liquid around the valve stem, and while any suitable shaped port may be applied at the outlet and inlet of the valve, a diamond shaped port such as shown at 24 is preferred.

Figure 2:
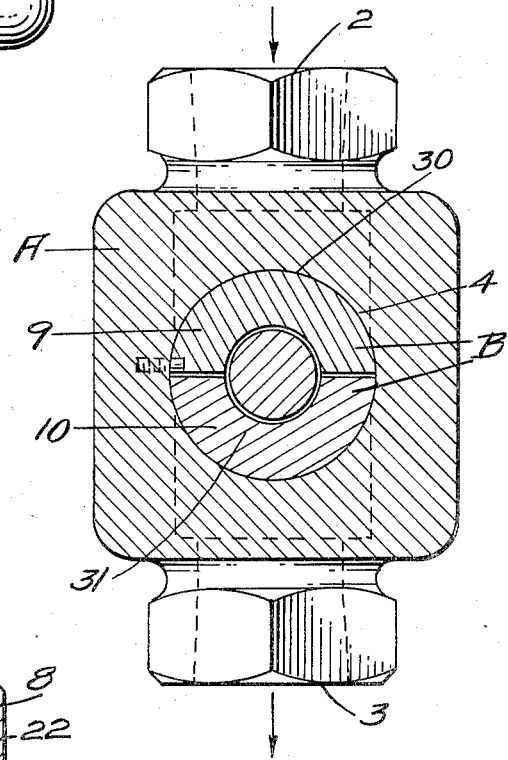
Fig. 2 is a plan section taken on line II—II of Fig. 1.

In actual operation let it be supposed that the valve is placed in a liquid supply line where the pressure may reach several hundred pounds to the square inch. If that is the case, it is obvious that perfect seating of the piston valve will be essential in order to prevent leakage when the valve is closed, and it is also essential that regulation of liquid flowing through the valve will be desirable so that definite quantities of liquid may be under control at all times. Seating of the piston valve to close flow through the inlet and discharge of the valve is accomplished by rotating the stem 16 so that the piston valve moves downwardly into engagement with the bottom section 5. During that period shoulders 12 and 21 are maintained in engagement by means of the spring 22. The moment, however, that the piston valve engages the bottom of the valve body, the tapering annular member 21 will move downwardly in the chamber 11, and as such will function as a wedge to force the two halves of the piston valve apart or into forceful engagement with the surfaces indicated at 30 and 31 (see Fig. 2). These surfaces are the valve seats, and by providing the proper taper substantially any contact pressure may be maintained between the piston valve sections and their respective seats. During such downward movement rotation of the half sections of the piston valve is prevented by the pin 15 and the groove 14. Furthermore, any fluid or liquid which may tend to become trapped between the lower end of the piston valve and the bottom of the body is free to escape upwardly through the groove 14. When the valve is to be opened, the stem is rotated by means of the handles 17 in the opposite direction and when so rotated the annular tapering member 21 on the lower end of the valve stem will advance upwardly in the chamber 11 and thus relieve the valve sections 9 and 10 of pressure against the seats 30 and 31, and when the shoulders 21 and 12 engage the piston valve will start to raise.

In Fig. 1 the valve is shown as more than three-quarters open. However, it may assume the position indicated by the dotted line 33. If that is the case the only liquid that will flow through the valve will be that presented by the area 34 just below the dotted line. Hence, the valve can assume a position where only a minute quantity of liquid or fluid will flow or it may be opened to permit a substantially full flow. For instance, by making the valve body A slightly longer than shown in Fig. 1 of the drawing, the bottom of the piston valve may obviously be raised to a point above the circle indicating the inlet 2, thus permitting a complete and full flow through the valve. The flow of fluid or liquid at all times is through the inlet port 2, then transversely through the cylinder chamber, and then through the discharge outlet 3. Substantially little, if any, liquid or fluid has a tendency to flow up through the groove 14 or to leak upwardly around the piston valve. Hence, there is little chance of sand or other foreign matter depositing between the piston valve and the seating surfaces 30 and 31. Also, wear is proportionately reduced and a long life is insured. The valve as a whole is simple and substantial in construction and few parts are employed, and while this and other features of the invention have been more or less specifically described and illustrated, it should be understood that changes may be resorted to within the scope of the appended claims and that the materials and finish of the several parts employed may be such as the experience or judgment of the manufacturer may dictate or varying conditions or uses may demand.

Having thus described my invention, what I claim and desire to secure by Letters Patent is:

In a valve of the character described having a cylinder chamber therein and a passage intersecting the cylinder chamber to permit fluid flow therethrough, said cylinder chamber being closed at one end and open at the other, a head forming a closure for the open end of the cylinder chamber, an exteriorly cylindrical piston valve in the cylinder chamber, said piston valve being split longitudinally into two halves, a conical chamber formed in the two halves of the piston valve, a two part interior collar formed integrally with said two halves of the piston valve at the larger end of said conical chamber, a rotatable valve stem threaded in said head and extending through said two part collar and into the piston valve, said stem terminating in a conical member rotatable together with said stem and substantially fitting the larger end of said conical chamber, a helical spring surrounding said stem and bearing directly upon said head and said two part collar, a handle for rotating and thereby imparting longitudinal movement to the valve stem for comparable movement of the piston valve longitudinally of the cylinder chamber to cover and uncover said passage, and a pin projecting from the wall of said cylinder chamber and disposed between the halves of said piston valve for securing the piston valve against rotation.

ALFRED J. VANDER WHITE.

REFERENCES CITED

The following references are of record in the file of this patent:

UNITED STATES PATENTS

| Number | Name | Date |
| --- | --- | --- |
| 99,943 | Peet | Feb. 15, 1870 |
| 222,994 | Hills | Dec. 30, 1879 |
| 468,305 | Pottle | Feb. 2, 1892 |
| 756,463 | Bosworth | Apr. 5, 1904 |
| 1,278,905 | Gifford | Sept. 17, 1918 |
| 1,525,516 | Smith | Feb. 10, 1925 |
| 1,869,741 | DuBois | Aug. 2, 1932 |
| 1,936,873 | Glab | Nov. 28, 1933 |

FOREIGN PATENTS

| Number | Country | Date |
| --- | --- | --- |
| 8,206 | Great Britain | May 3, 1900 |
| 11,815 | Great Britain | May 21, 1913 |